(No Model.) 2 Sheets—Sheet 1.
T. O'BRIEN.
TRICYCLE.
No. 372,429. Patented Nov. 1, 1887.
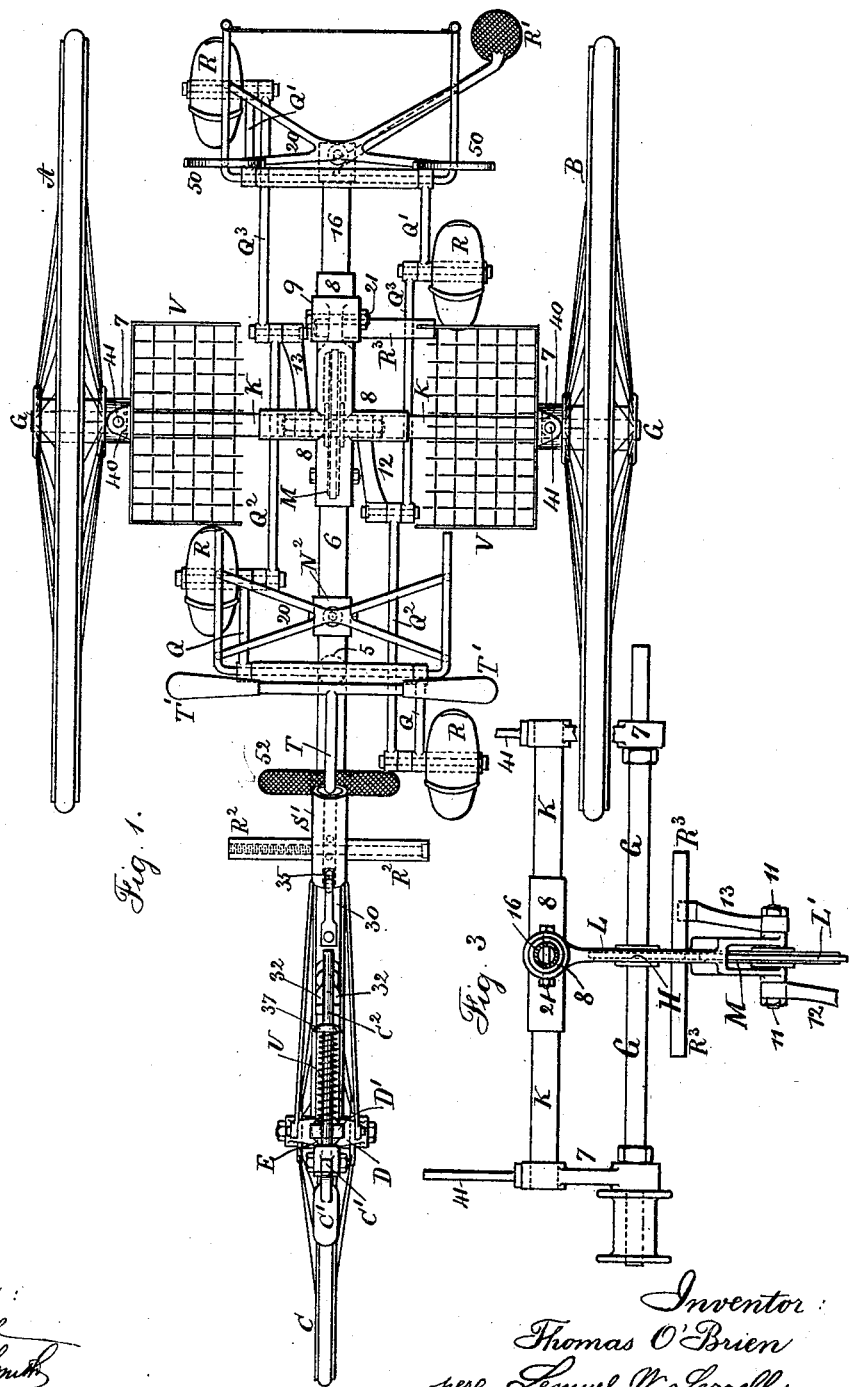

(No Model.) 2 Sheets—Sheet 2.
T. O'BRIEN.
TRICYCLE.
No. 372,429. Patented Nov. 1, 1887.
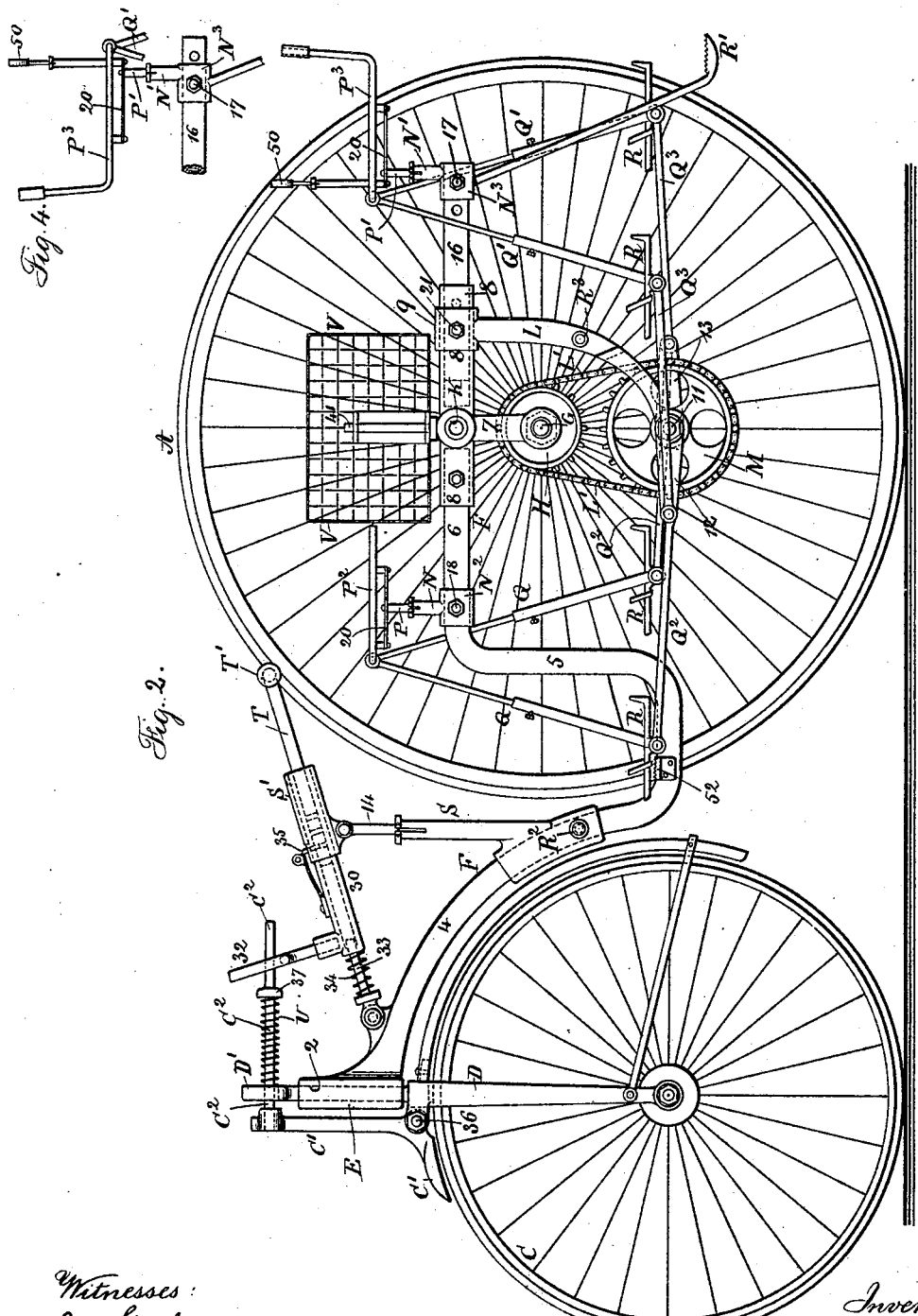
Witnesses:
J. Staib
Chos. H. Smith
Inventor:
Thomas O'Brien
per Lemuel W. Serrell Atty

UNITED STATES PATENT OFFICE.

THOMAS O'BRIEN, OF NEW YORK, N. Y.

TRICYCLE.

SPECIFICATION forming part of Letters Patent No. 372,429, dated November 1, 1887.

Application filed February 21, 1887. Serial No. 228,326. (No model.)

*To all whom it may concern:*

Be it known that I, THOMAS O'BRIEN, of the city and State of New York, have invented Improvements in Tricycles, of which the following is a specification.

These improvements relate to the steering mechanism and the brake, both of which are actuated by different movements of one handle-bar; also to a peculiar construction of the frame that connects the respective wheels and carries the saddles or seats of the riders, and the rear seat is reversible, so as to be adapted to use by a lady.

In my application filed February 18, 1887, Serial No. 228,016, the frame of a bicycle is arranged with two seats. The present invention does not relate, broadly, to the two seats upon the frame of the tricycle; but is limited to the arrangement shown, and hereinafter described.

In the drawings, Figure 1 is a plan view of the tricycle with part of the basket removed. Fig. 2 is an elevation with the near driving-wheel removed. Fig. 3 is a rear view of the frame and axle, and Fig. 4 shows the rear seat in its reverse position.

The driving-wheels A B and the steering-wheel C are made in any usual or desired manner, and there is a fork, D, for the steering-wheel, the vertical pivot-pin 2 of which passes through the socket E at the forward end of the frame F. This frame has an arching spine, 4, and a rising body, 5, and horizontal arm 6, and the bearings 7 are below cross-pieces K of the frame, and through these bearings the axle G passes, and securely fastened to the axle is the chain-wheel H. The cross-tube K passes through the cross branches of the sleeve 8, and the bearings 7 for the revolving axle G are preferably near the ends of this tube K, so as to be adjacent to the wheels, and they should be made with anti-friction balls. The hubs of the wheels A B are connected with the axle G in any convenient manner. Usually one of the hubs will be provided with a ratchet-and-pawl connection that allows one wheel to move faster than the other in turning a curve. The tubular sleeve 8 extends to the rear and has around it the sleeve 9, from which depends the jaw-frame L, the forked lower ends of which are provided with bearings that receive through them the shaft 11, and upon such shaft is the chain-wheel M, from which the endless chain L' passes to the chain-wheel H upon the axle G, and at the ends of the shaft 11 are the cranks 12 and 13. The vertical tubular columns N N' are upon the sleeves $N^2$ $N^3$, that surround the tubular portions 6 and 16 of the frame, and bolts 17 18, passing through the respective sleeves and tubes, hold the sleeves in position when they have been properly placed. The upper end of each tubular column is slotted and provided with a clamping-ring, by which it can be tightened to grasp the sliding standard P or P' and raise or lower the seat. There are diverging springs 20 extending out from head-pieces on the sliding standard to frames $P^2$ $P^3$, that receive leather or other flexible material to form the seats or saddles for the riders, and from the front piece of each seat the links Q Q' hang, and they are connected by the rods $Q^2$ $Q^3$ with the cranks 12 and 13 upon the shaft 11, and there are treadles R at the junctions of the respective links and connecting-rods, so that the persons upon the seats can propel the tricycle by the action of the feet upon said treadles, imparting to them a swinging movement.

The rear seat, $P^3$, is supported upon a tubular arm, 16, that slides within the sleeve 8, and there are two or more cross-holes through this tubular arm, so that by removing the bolts 21 the tubular arm can be pushed in or drawn out until either of the holes coincides with the hole in such sleeve, so that the bolt can be replaced for holding the parts firmly. This allows the seat to be moved farther back or forward, and it also allows for the seat to be loosened and reversed, as shown in Fig. 4; and in order to bring the seat $P^3$ into the proper position in relation to the other parts, it is usually necessary to withdraw the bolt 17 and slip the tubular column N' back farther and insert the bolt 17 through another hole in the tubular arm 16.

The links Q Q' are preferably made in two parts, the lower portions being tubular, so that the links can be lengthened so as to accommodate the legs of the rider, and this also allows for the links being separated when the seat $P^3$ is turned around into the position shown in Fig. 4, after which the parts of the links Q' are again connected. R' is a step to facilitate mounting into the seat P³, and R² and R³ are cross-rails upon the respective parts 4 and L to form foot-rests.

It will be understood that the seat P³, when turned around into the position shown in Fig. 4, is usually the most convenient for a female rider; otherwise the legs would necessarily straddle the tubular arm 16.

Upon the spine 4 is a column, S, split at its upper end and provided with a clamping-ring for securing the sliding rod 14 after the parts have been adjusted. Jointed to the upper end of this rod 14 is a tubular guide, S', through which passes the handle-bar T, at the rear end of which are the cross-handles T', and around this handle-bar and within the tubular guide S' is a slide-tube, 30, with a crank-arm at its forward top end, into which is firmly fixed a jaw, 32.

33 is a pin jointed at the forward end to the spine 4, and around which is an expansive spring, 34, and this jointed pin passes into the forward end of the slide-tube 30 and is in line with the handle-bar T, and upon the top of this slide-tube 30 is a hook, 35, the end of which passes through a hole in such tube 30 into one of a range of holes in the handle-bar T. By this means the handles T' can be drawn nearer to or farther from the seat P² after lifting the hook 35; but when the hook is in place it connects the slide-tube 30 and handle-bar T, so that these parts can be pushed forward against the spring 34 in steering or applying the brake, as hereinafter described; but there is a notch in the forward upper part of the tubular guide S', in which the hook 35 usually rests, as seen in Fig. 2, so that the handle-bar is kept from turning until pushed slightly forward to carry the hook 35 clear of the end of the tubular guide S'.

At the top end of the vertical pivot-pin 2 is a fork, D', and the brake C' is pivoted at 36 upon the fork D, and at the upper end of the brake C' is an arm, C², extending backwardly through the fork D' and through the jaw 32, and there is an expansive spring, U, around the arm C², between the fork D' and the half-globular button 37. This spring U raises the brake from off the steering-wheel C when the parts are in a normal position, and when the handle-bar T' and slide-tube 30 are pushed forward and the hook 35 is free from the tubular guide S' the handles can be turned and the tricycle steered by the jaw 32, acting upon the arm C² and turning the pivot 2, fork D, and steering-wheel in either direction. When the brake is to be applied, it is only necessary to push the handle-bar forward, compressing the springs 34 and U, and the jaw 32, pressing upon the button 37, forces the arm C² and the upper end of the brake-lever C' forward, so that the foot of the brake rests with the desired pressure upon the wheel C.

In order to facilitate the carrying of bundles or baggage, I make a basket or crate, V, and this basket is stiffened by metallic straps 40, running partially up the ends and having its ends turned outwardly and horizontally, and they are perforated, so as to set over the vertical pins 41, that rise above the bearings 7. This allows the basket to be lifted off when not required. I prefer to make this basket of interlaced wires.

The arm-rests 50, applied at the sides of the back seat, P³, are convenient for resting the arms upon, or for grasping to steady the person.

It will be understood that by carrying the curved spine 4 down below the treadles, and by carrying up the tubular frame beneath the seat P², the front seat is specially adapted to a lady rider, as the frame does not get in the way of the dress.

When only one rider uses this tricycle, the back seat can be entirely removed by taking out the bolt 17 and disconnecting the rod Q³ from the cranks 12 13. A step, 52, is preferably provided on the frame at the base of the spine.

I claim as my invention—

1. The combination, with the wheels A B, axle G, steering-wheel C, and fork D, of the frame formed with the arching spine 4, rising body 5, horizontal arm 6, sleeve 8, bearings 7, and cross-tube K, substantially as set forth.

2. The combination, in a tricyle, of the wheels A B, steering-wheel C, fork D, frame F, cross-tube K, bearings 7, jaw-frame L, chain-wheels H and M, the latter being held by the jaw-frame L, and the former being upon the axle G of the wheels A B, the cranks 12 and 13, and the connecting-rods, treadles, and links by which the chain-wheels and driving-wheels are revolved, substantially as set forth.

3. The combination, with the driving-wheels A B and their axle, the steering-wheel C, and fork D, of the frame connecting the fork of the steering-wheel to the axle of the driving-wheels and extending to the rear, the column N' and rear seat, P³, the column N and seat P², and the links pivoted at their upper ends to the seat-frame, the treadles, connecting-rods, cranks, and chain-wheels, substantially as set forth.

4. A seat-frame for a tricyle formed of diverging springs 20, connected at their outer ends to the metallic seat-frame, in combination with a vertical tubular column, a sliding standard within the column and connected at its upper end with the diverging spring, and a clamp for holding the standard after it has been adjusted vertically within the column, substantially as set forth.

5. The combination, with the tricyle-frame F, of the rear seat, P³, the vertical tubular column for supporting the same, the tubular arm 16, passing into the rear end of the tubular frame, and the tubular sleeve at the base of the column and surrounding the tubular arm, and bolts passing through holes for securing the respective parts when adjusted, substantially as set forth.

6. The combination, with the steering-wheel of the tricycle, of a brake pivoted to the fork of the steering-wheel, an arm projecting from the upper end of the brake-lever, a handle-bar, crank-arm, and jaw for steering the tricycle and applying the brake, substantially as set forth.

7. The combination, with the steering-wheel, fork, and vertical pivot, of a frame, a tubular guide upon the frame, a handle bar, and slide-tube passing through the tubular guide, a crank-arm, and an arm passing from the vertical pivot to the crank-arm for turning the steering-wheel, substantially as set forth.

8. The combination, with the handle-bar and its slide-tube, of a hook passing into holes in the handle-bar and slide-tube, a tubular guide notched for the reception of the hook, and a connection between the handle-bar and the pivot of the steering-wheel, substantially as set forth.

Signed by me this 15th day of February, A. D. 1887.

THOMAS O'BRIEN.

Witnesses:
GEO. T. PINCKNEY,
WILLIAM G. MOTT.